United States Patent
Hwang et al.

(10) Patent No.: US 8,564,743 B2
(45) Date of Patent: Oct. 22, 2013

(54) REFLECTIVE POLYMER DISPERSED LIQUID CRYSTAL DISPLAY DEVICE

(75) Inventors: Kyu-young Hwang, Ansan-si (KR); Gae-hwang Lee, Hwaseong-si (KR); Jae-eun Jung, Seoul (KR); Jae-eun Jang, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 216 days.

(21) Appl. No.: 13/107,179

(22) Filed: May 13, 2011

(65) Prior Publication Data

US 2012/0169971 A1   Jul. 5, 2012

(30) Foreign Application Priority Data

Jan. 4, 2011 (KR) .................. 10-2011-0000550

(51) Int. Cl.
*G02F 1/1333* (2006.01)
(52) U.S. Cl.
USPC .................. 349/86; 349/88; 349/93
(58) Field of Classification Search
USPC .................. 349/86, 88, 93
See application file for complete search history.

(56) References Cited

U.S. PATENT DOCUMENTS

| | | | |
|---|---|---|---|
| 2008/0239198 A1 | 10/2008 | Kim et al. | |
| 2009/0027603 A1* | 1/2009 | Samulski et al. | 349/124 |
| 2011/0109659 A1* | 5/2011 | Tang et al. | 345/690 |
| 2011/0134373 A1* | 6/2011 | Kim et al. | 349/93 |
| 2011/0186791 A1* | 8/2011 | Furukawa et al. | 252/589 |

FOREIGN PATENT DOCUMENTS

| | | |
|---|---|---|
| EP | 2209040 A2 | 7/2010 |
| JP | 11064842 A | 3/1999 |
| KR | 100766579 B1 | 10/2007 |

* cited by examiner

*Primary Examiner* — Phu Vu
(74) *Attorney, Agent, or Firm* — Harness, Dickey & Pierce (57) ABSTRACT

A reflective polymer dispersed liquid crystal (PDLC) display device may include a plurality of first and second electrodes on the first and second substrates, the first and second substrates separate from each other, a polymer dispersed liquid crystal (PDLC) layer between the plurality of first and second electrodes, the PDLC layer including polymer, liquid crystal, and a chain transfer reagent, and a specular reflection plate on the first substrate.

19 Claims, 5 Drawing Sheets

REFLECTIVE POLYMER DISPERSED LIQUID CRYSTAL DISPLAY DEVICE

CROSS-REFERENCE TO RELATED APPLICATIONS

This application claims the benefit of Korean Patent Application No. 10-2011-0000550, filed on Jan. 4, 2011, in the Korean Intellectual Property Office, the entire contents of which is incorporated herein by reference.

BACKGROUND

1. Field

Example embodiments relate to methods and apparatuses for a reflective liquid crystal display device, and more particularly, to a reflective polymer dispersed liquid crystal display device.

2. Description of the Related Art

Polymers and liquid crystals are uniformly distributed in polymer dispersed liquid crystal (PDLC). When an electric field is applied to the PDLC, optical refractive indexes of the polymer and the liquid crystal may be changed. Accordingly, the PDLC may scatter or transmit light by adjusting a difference in the refractive index between the liquid crystal and the polymer using the application of an electric field. As such, the PDLC may be usefully applied to a reflective display device for displaying information or an image using an external light source.

The reflective display device including the PDLC may employ an absorption layer that absorbs light transmitting the PDLC. However, in the reflective display device using the absorption layer, a reflection efficiency may be deteriorated because light that may be scattered by the PDLC and incident on the absorption layer may be extinguished. A solution to generate much more scattering by increasing the thickness of the PDLC may be considered to solve the above problem. In this case, however, a drive voltage is increased. Also, even when the thickness of the PDLC increases, absorption of light by the absorption layer may be generated so that there is a limit in improving a reflection efficiency.

Figure 1:
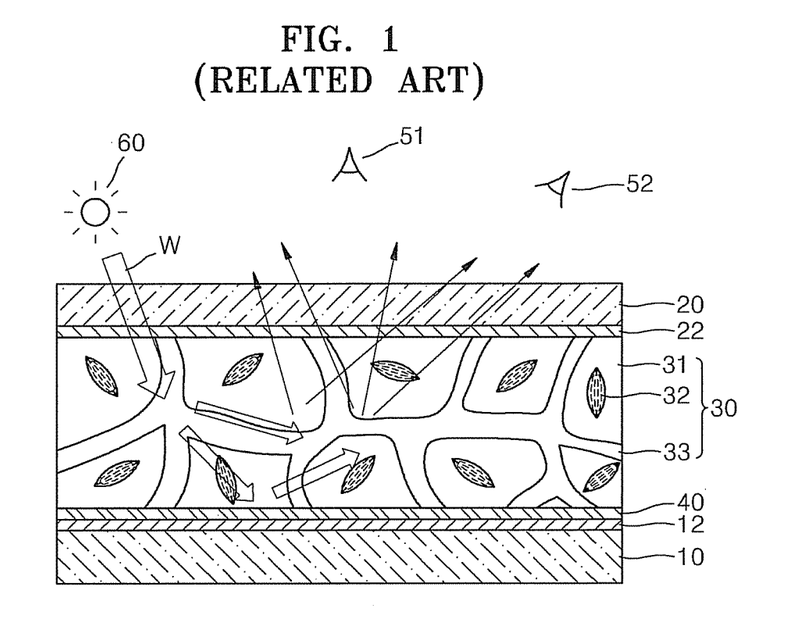
FIGS. 1 and 2 illustrate an example of a reflective polymer dispersed liquid crystal display device according to a related technology.
Figure 2:
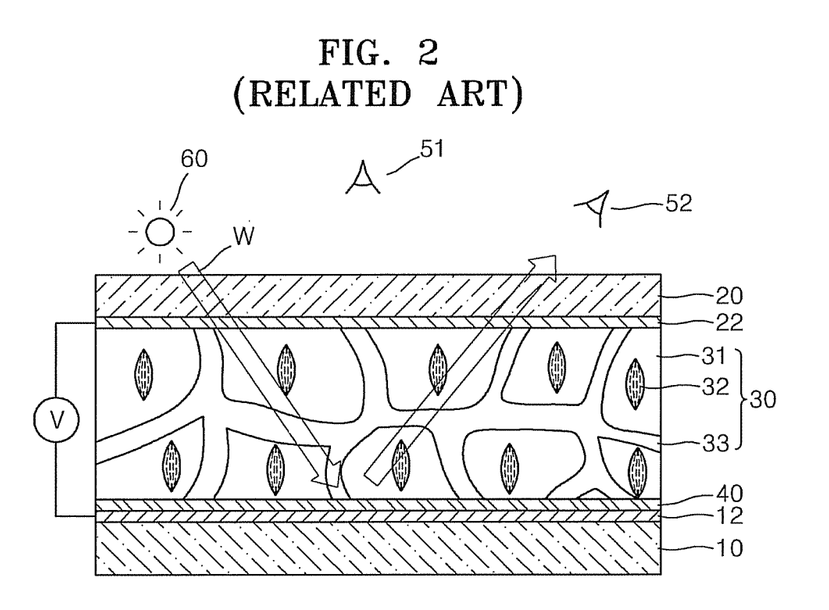

FIGS. 1 and 2 illustrate an example of a reflective polymer dispersed liquid crystal display device according to a related art. In detail, FIG. 1 illustrates a state in which a voltage is not applied to a polymer dispersed liquid crystal layer, whereas FIG. 2 illustrates a state in which a voltage is applied to the polymer dispersed liquid crystal layer.

Referring to FIGS. 1 and 2, a first substrate 10 and a second substrate 20 may be arranged to be separated a given distance from each other. A first electrode 12 may be formed on an upper surface of the first substrate 10. A second electrode 22 may be formed on a lower surface of the second substrate 20. A specular reflection plate 40 for mirror-reflecting incident light may be formed on an upper surface of the first electrode 12. A polymer dispersed liquid crystal (PDLC) layer 30 may be provided between the specular reflection plate 40 and the second electrode 22. Polymer 33 and liquid crystal 31 may be uniformly distributed in the PDLC layer 30.

In the above structure, as illustrated in FIG. 1, when a voltage is not applied between the first and second electrodes 12 and 22, liquid crystal molecules 32 may be randomly arranged in the PDLC layer 30. In this state in which the liquid crystal molecules 32 are randomly arranged, a white light W output from an external light source 60, e.g., the sun, and incident on the PDLC layer 30 may be scattered in a variety of directions due to a difference in the refractive indexes between the polymer 33 and the liquid crystal 31. A part of the scattered light may be transmitted out through the second substrate 20, whereas the other part of the scattered light may be reflected by the specular reflection plate 40 and scattered and transmitted out through the second substrate 20. Thus, first and second observers 51 and 52 located above the second substrate 20 recognize a white light.

As illustrated in FIG. 2, when a given voltage V is applied between the first and second electrodes 12 and 22, the liquid crystal molecules 32 may be arranged in the PDLC layer 30 in a direction parallel to an electric field, that is, in a direction perpendicular to the first and second substrates 10 and 20. When the liquid crystal molecules 32 are perpendicularly arranged, the refractive index of the polymer 33 may be similar to that of the liquid crystal 31 so that the white light W output from the external light source 60 may be transmitted through the PDLC layer 30. The white light W may be specularly reflected by the specular reflection plate 40 and transmitted out through the second substrate 20. Thus, the first observer 51 located directly above the second substrate 20 recognizes a black light. In contrast, the second observer 52 located at a particular reflection angle, that is, at an angle where incident light may be reflected by the specular reflection plate 40, recognizes a very bright white light.

Accordingly, in the above reflective polymer liquid crystal display device, because the specular reflection plate 40 is used, a reflection efficiency may be improved. However, although a black light should be recognized when a voltage is applied to the PDLC layer 30, a white light brighter than that in a case when a voltage is not applied is recognized by the second observer 52 located at a particular reflection angle, that is, a reflection inversion phenomenon is generated, so that visibility is deteriorated.

SUMMARY

Example embodiments provide methods and apparatuses for a reflective polymer dispersed liquid crystal display device which may improve visibility. Additional aspects will be set forth in part in the description which follows and, in part, will be apparent from the description, or may be learned by practice of the presented embodiments.

According to example embodiments, a reflective polymer dispersed liquid crystal (PDLC) display device may include a plurality of first and second electrodes on first and second substrates, the first and second substrates separate from each other, a polymer dispersed liquid crystal (PDLC) layer between the plurality of first and second electrodes, the PDLC layer including polymer, liquid crystal, and a chain transfer reagent, and a specular reflection plate on the first substrate.

The specular reflection plate may be integrally formed with the plurality of first electrodes. The specular reflection plate may be formed of a metal thin film. The concentration of the chain transfer reagent may be about 0.01-1 weight %. The second substrate and the plurality of second electrodes may be formed of a transparent material.

The plurality of first electrodes may be formed to correspond to pixels and the plurality of second electrodes may be integrally formed to form a common electrode. The plurality of first and second electrodes may be formed in strips crossing each other. The reflective polymer dispersed liquid crystal display device may further include a plurality of color filter layers on the first substrate or the second substrate, the plurality of color filter layers having different colors. The color filter layers may include red, green, and blue color filter layers, or cyan, magenta, and yellow color filter layers.

According to example embodiments, a reflective polymer dispersed liquid crystal (PDLC) display device may include a plurality of first and second electrodes on first and second substrates, the first and second substrates separate from each other, a polymer dispersed liquid crystal (PDLC) layer between the plurality of first and second electrodes, the PDLC layer including polymer, liquid crystal, and a brightener material that is excited by an ultraviolet light to emit a visible light, and a specular reflection plate on the first substrate.

The specular reflection plate may be integrally formed with the plurality of first electrodes.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. In the drawings, the size or thickness of each element may be exaggerated for clarity of explanation.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 3:
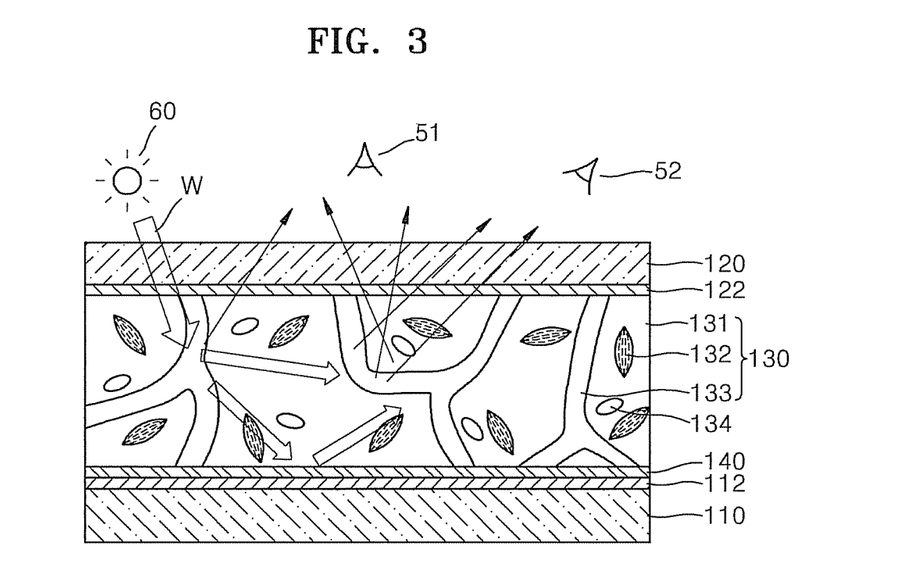
FIGS. 3 and 4 illustrate a reflective polymer dispersed liquid crystal display device according to example embodiments.
Figure 4:
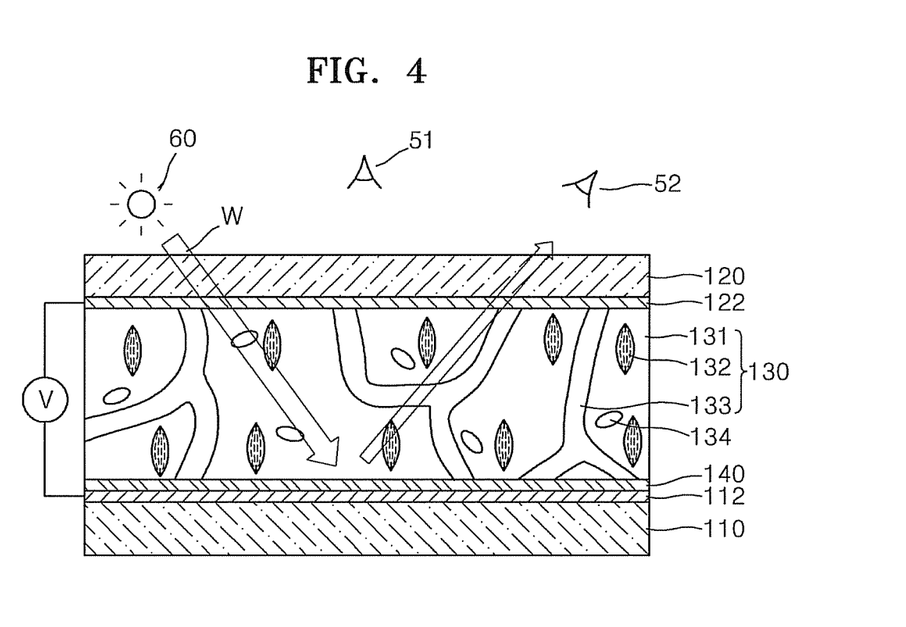

FIGS. 3 and 4 illustrate a reflective polymer dispersed liquid crystal display device according to example embodiments. In detail, FIG. 3 illustrates a state in which a voltage is not applied to a polymer dispersed liquid crystal (PDLC) layer 130, whereas FIG. 4 illustrates a state in which a voltage is applied to the PDLC layer 130. The reflective polymer dispersed liquid crystal display device according to example embodiments may include a plurality of pixels. FIGS. 3 and 4 illustrate only one of the pixels for convenience of explanation, which is applied to the following drawings.

Referring to FIGS. 3 and 4, a first substrate 110 that is a lower substrate and a second substrate 120 that is an upper substrate may be arranged to be separated a given distance from each other. For example, a glass substrate may be used as the first substrate 110, but example embodiments are not limited thereto and a variety of substrates may be used therefor. A substrate formed of a transparent material may be used as the second substrate 120. For example, a glass substrate or a plastic substrate may be used as the second substrate 120, but example embodiments are not limited thereto.

A plurality of first electrodes 112 may be formed on an upper surface of the first substrate 110. A plurality of second electrodes 122 may be formed on a lower surface of the second substrate 120. The first electrodes 112 may be formed of a conductive material, for example, a metal material, or a transparent conductive material, e.g., indium tin oxide (ITO). The second electrodes 122 may be formed of a transparent conductive material. When the reflective display device according to example embodiments is an active matrix (AM) driving display device, the first electrodes 112 have a shape corresponding to the pixels and the second electrodes 122 may be integrally formed so as to constitute a common electrode. A thin film transistor TFT (not shown) for switching drive of a pixel may be connected to each of the first electrodes 112. When the reflective display device according to example embodiments is a passive matrix (PM) driving display device, the first electrodes 112 may be arranged in strips parallel to each other and the second electrodes 122 may be formed in strips parallel to each other crossing the first electrodes 112.

A specular reflection plate 140 may be provided on an upper surface of each of the first electrodes 112. The specular reflection plate 140 may mirror-reflect incident light and may be formed of a metal thin film including, for example, Al, Cr, or a metal alloy. When the specular reflection plate 140 and the first electrodes 112 are formed of metal, specular reflection plate 140 and the first electrodes 112 may be integrally formed. The specular reflection plate 140 may be formed of any material capable of generating mirror-reflection, for example, a material whose surface is coated with a metal material, in addition to the above-described metal thin film.

The PDLC layer 130 may be formed between the specular reflection plate 140 and the second electrodes 122. The PDLC layer 130 may include polymer 133, liquid crystal 131, and a chain transfer reagent 134. The polymer 133 may be formed in a network format in the PDLC layer 130. The chain transfer reagent 134 removes radicals in a radical polymerization process so that network morphology of the polymer 133 may be changed. In general, the PDLC including polymer and liquid crystal may be formed in a curing process due to photopolymerization reaction in a state in which liquid crystals and monomers are uniformly mixed. In example embodiments, when a small amount of the chain transfer reagent 134 that can remove a radical is added to a mixture in which the liquid crystal 131 and monomers (not shown) are uniformly mixed, the network morphology of the polymer 133 that is formed may change.

In detail, the chain transfer reagent 134 removes radicals in the radical polymerization process during which the monomer changes into the polymer 133. Accordingly, the polymerization reaction may be terminated and the molecular weight of the polymer 133 may be reduced. A material, e.g., thiols or nitrile, which is well known as one capable of removing radicals, may be used as the chain transfer reagent 134. The chain transfer reagent 134 deforms the network morphology of the polymer 133 so that the amount of light reflected by the specular reflection plate 140 may be reduced as described later. In example embodiments, the concentration of the chain transfer reagent 134 included in the PDLC layer 130 may be, for example, about 0.01-1 weight %. However, example embodiments are not limited thereto.

In the above structure, as illustrated in FIG. 3, the liquid crystal molecules 132 may be randomly arranged in the PDLC layer 130 when a voltage is not applied between the first and second electrodes 112 and 122. In this state in which the liquid crystal molecules 132 may be randomly arranged, for example, a white light W output from the external light source 60, e.g., the sun, and incident on the PDLC layer 130 may be scattered in a variety of directions due to a difference in the refractive indexes of the polymer 133 and the liquid crystal 131. A part of the dispersed light may be transmitted out through the second substrate 120, whereas the other part of the dispersed light may be reflected by the specular reflection plate 140 and scattered and transmitted out through the second substrate 120. Thus, the first and second observers 51 and 52 located above the second substrate 120 recognize a white light.

As illustrated in FIG. 4, when a given voltage V is applied between the first and second electrodes 112 and 122, the liquid crystal molecules 132 may be arranged in the PDLC layer 130 in a direction parallel to an electric field, that is, in a direction perpendicular to the first and second substrates 110 and 120. When the liquid crystal molecules 132 are perpendicularly arranged, the refractive index of the polymer 133 may be similar to that of the liquid crystal 131 so that the white light W output from the external light, source 160 may be transmitted through the PDLC layer 130. The white light W may be specularly reflected by the specular reflection plate 140 and transmitted out through the second substrate 120. Thus, the first observer 51 located directly above the second substrate 120 recognizes a black light. In contrast, the second observer 52 located at a particular reflection angle recognizes a white light reflected by the specular reflection plate 140. However, the second observer 52 recognizes a white light weaker than the white light W output from the external light source 60. That is, as the network morphology of the polymer 133 is changed by the chain transfer reagent 134 included in the PDLC layer 130, reflectance of the incident white light W may be deteriorated. As such, as the second observer 52 recognizes a weak white light, the reflection inversion phenomenon may be reduced so that visibility may be improved.

In example embodiments, the specular reflection plate 140 may be provided on the upper surface of the first electrode 112. However, although not shown, when the first electrode 112 is formed of a transparent conductive material, the specular reflection plate 140 may be provided on a lower surface of the first electrode 112. Also, when the first electrode 112 and the first substrate 110 are formed of a transparent material, the specular reflection plate 140 may be provided on a lower surface of the first substrate 110.

Figure 5:
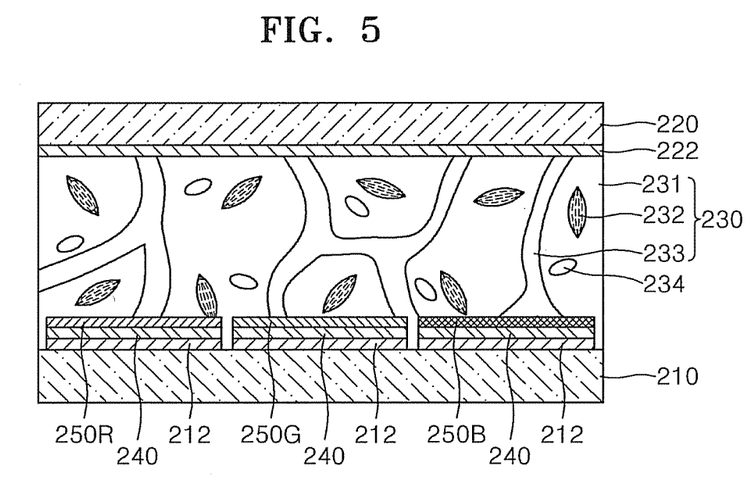
FIG. 5 illustrates a reflective polymer dispersed liquid crystal display device according to example embodiments.

FIG. 5 illustrates a reflective polymer dispersed liquid crystal display device according to example embodiments. In FIG. 5, the reflective polymer dispersed liquid crystal display device of example embodiments adopts a color filter. The following description will focus on technical differences from example embodiments as illustrated in FIG. 4.

The reflective polymer dispersed liquid crystal display device according to example embodiments may include a plurality of pixels as illustrated in FIGS. 4 and 5, and each of the pixels may include sub-pixels of different colors. For example, each pixel may include red, green, and blue sub-pixels. However, example embodiments are not limited thereto and each pixel may include, for example, cyan, magenta, and yellow sub-pixels.

Referring to FIG. 5, a first substrate 210 that is a lower substrate and a second substrate 220 that is an upper substrate may be arranged to be separated a given distance from each other. A plurality of first electrodes 212 may be formed on an upper surface of the first substrate 210. A plurality of second electrodes 222 may be formed on a lower surface of the second substrate 220. The first electrodes 212 may be formed of, for example, a metal material or a transparent conductive material, e.g., ITO. The second electrodes 222 may be formed of a transparent conductive material.

When the reflective display device according to example embodiments is an AM driving display device, the first electrodes 212 have a shape corresponding to sub-pixels and the second electrodes 222 may be integrally formed so as to constitute a common electrode. A TFT (not shown) for a switching drive of a sub-pixel may be connected to each of the first electrodes 212. When the reflective display device according to example embodiments is a PM driving display device, the first electrodes 212 may be arranged in strips parallel to each other and the second electrodes 222 may be formed in strips parallel to each other crossing the first electrodes 212.

A plurality of specular reflection plates 240 may be provided on upper surfaces of the first electrodes 212. The specular reflection plates 240 mirror-reflect incident light and may be formed of, for example, a metal thin film. In addition to the above-described metal thin film, any material capable of generating mirror-reflection, e.g., a material whose surface is coated with a metal material, may be used for the specular reflection plates 240. When the specular reflection plates 240 and the first electrodes 212 both are formed of metal, the specular reflection plates 240 and the first electrodes 212 may be integrally formed. A plurality of color filter layers having different colors may be provided on upper surfaces of the specular reflection plates 240. The color filter layers may be provided corresponding to sub-pixels and may include, for example, a red color filter layer 250R, a green color filter layer 250G, and a blue color filter layer 250B. However, example embodiments are not limited thereto and the color filter layers may include, for example, a cyan color filter layer, a magenta color filter layer, and a yellow color filter layer.

A PDLC layer 230 may be formed between the color filter layers 250R, 250G, and 250B and the second electrodes 222. The PDLC layer 230 may include polymer 233, liquid crystal 231, and a chain transfer reagent 234. In FIG. 5, reference numeral 232 denotes liquid crystal molecules. The polymer 233 may be formed in the PDLC 230 in a network format. As described above, the chain transfer reagent 234 removes radicals in the radical polymerization process so that network morphology of the polymer 233 may be changed. A material that is well known as one capable of removing radicals may be used as the chain transfer reagent 234. In example embodiments, the concentration of the chain transfer reagent 234 included in the PDLC layer 230 may be, for example, about 0.01-1 weight %. However, example embodiments are not limited thereto.

In example embodiments, as described above, because the PDLC layer 230 may include the chain transfer reagent 234, when a voltage is applied to the PDLC layer 230, reflectance of light incident from the external environment may be reduced so that visibility may be improved. In example embodiments, the specular reflection plates 240 are described as being provided on the upper surfaces of the first electrodes 212. However, although not shown, when the first electrodes 212 are formed of a transparent conductive material, the specular reflection plates 240 may be provided on lower surfaces of the first electrodes 212. When the first electrodes 212 and the first substrate 210 both are formed of a transparent material, the specular reflection plates 240 may be provided on lower surfaces of the first substrate 210.

Figure 6:
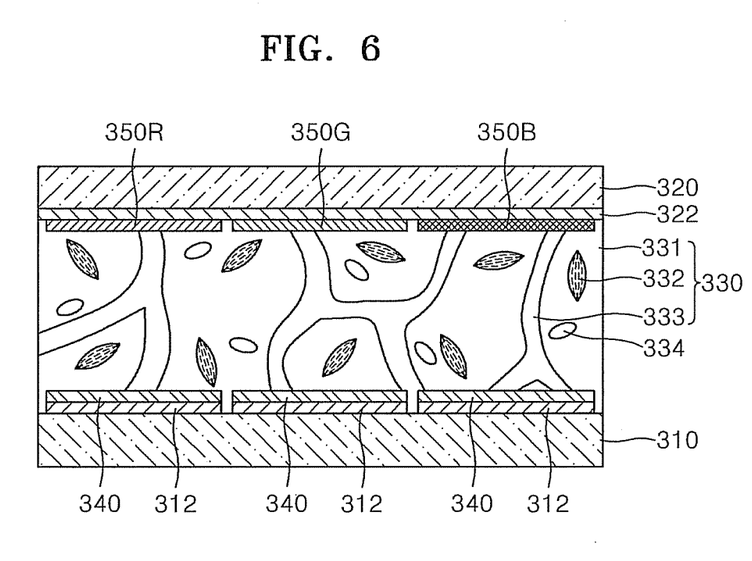
FIG. 6 illustrates a reflective polymer dispersed liquid crystal display device according to example embodiments.

FIG. 6 illustrates a reflective polymer dispersed liquid crystal display device according to example embodiments. FIG. 6 illustrates a modified example of the reflective polymer dispersed liquid crystal display device of FIG. 5. The following description will focus on technical differences from example embodiments as illustrated in FIG. 5.

Referring to FIG. 6, a first substrate 310 and a second substrate 320 may be arranged to be separated a given distance from each other. A plurality of first electrodes 312 may be formed on an upper surface of the first substrate 310. A plurality of second electrodes 322 may be formed on a lower surface of the second substrate 320. A plurality of specular reflection plates 340 may be provided on upper surfaces of the first electrodes 312. The specular reflection plates 340 mirror-reflect incident light and may be formed of, for example, a metal thin film. In addition to the above-described metal thin film, any material capable of generating mirror-reflection, e.g., a material whose surface is coated with a metal material, may be used for the specular reflection plates 340. When the specular reflection plates 340 and the first electrodes 312 both are formed of metal, the specular reflection plates 340 and the first electrodes 312 may be integrally formed.

A plurality of color filter layers having different colors may be provided on lower surfaces of the second electrodes 322. The color filter layers may be provided corresponding to sub-pixels and may include, for example, a red color filter layer 350R, a green color filter layer 350G, and a blue color filter layer 350B. However, example embodiments are not limited thereto and the color filter layers may include, for example, a cyan color filter layer, a magenta color filter layer, and a yellow color filter layer. A PDLC layer 330 may be formed between the color filter layers 350R, 350G, and 350B and the first electrodes 312. The PDLC layer 330 may include polymer 333, liquid crystal 331, and a chain transfer reagent 334. In FIG. 6, reference numeral 332 denotes liquid crystal molecules. The chain transfer reagent 334 may be a material for removing radicals and a material that is well known as one capable of removing radicals may be used as the chain transfer reagent 334. In example embodiments, the concentration of the chain transfer reagent 334 included in the PDLC layer 330 may be, for example, about 0.01-1 weight %. However, example embodiments are not limited thereto.

In example embodiments, as described above, because the PDLC layer 330 may include the chain transfer reagent 334, when a voltage is applied to the PDLC layer 330, reflectance of light incident from the external environment may be reduced so that visibility may be improved. In example embodiments, the specular reflection plates 340 are described as being provided on the upper surfaces of the first electrodes 312. However, when the first electrodes 312 are formed of a transparent conductive material, the specular reflection plates 340 may be provided on lower surfaces of the first electrodes 312. When the first electrodes 312 and the first substrate 310 both are formed of a transparent material, the specular reflection plates 340 may be provided on the lower surface of the first substrate 310.

Figure 7:
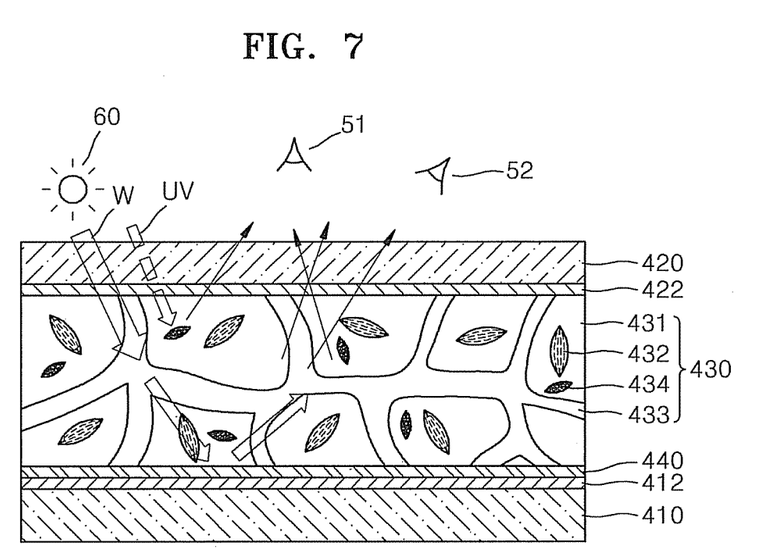
FIG. 7 illustrates a reflective polymer dispersed liquid crystal display device according to example embodiments.

FIG. 7 illustrates a reflective polymer dispersed liquid crystal display device according to example embodiments. Referring to FIG. 7, a first substrate 410 that is a lower substrate and a second substrate 420 that is an upper substrate may be arranged to be separated a given distance from each other. A glass substrate, for example, may be used as the first substrate 410, but a substrate formed of various materials may be used therefor. A substrate formed of a transparent material may be used as the second substrate 420. For example, a glass substrate or a plastic substrate may be used as the second substrate 420. However, example embodiments are not limited thereto.

A plurality of first electrodes 412 may be formed on an upper surface of the first substrate 410. A plurality of second electrodes 422 may be formed on a lower surface of the second substrate 420. The first electrodes 412 may be formed of, for example, a metal material or a transparent conductive material, e.g., ITO. The second electrodes 422 may be formed of a transparent conductive material. When the reflective display device according to example embodiments is an AM driving display device, the first electrodes 412 have a shape corresponding to sub-pixels and the second electrodes 422 may be integrally formed so as to constitute a common electrode. A TFT for switching drive of a sub-pixel may be connected to each of the first electrodes 412. When the reflective display device according to example embodiments is a PM driving display device, the first electrodes 412 may be arranged in strips parallel to each other and the second electrodes 422 may be formed in strips parallel to each other, crossing the first electrodes 412.

A plurality of specular reflection plates 440 may be provided on upper surfaces of the first electrodes 412. The specular reflection plates 440 mirror-reflect incident light and may be formed of a metal thin film, e.g., Al or Cr. When the specular reflection plates 440 and the first electrodes 412 both are formed of metal, the specular reflection plates 440 and the first electrodes 412 may be integrally formed. The specular reflection plates 440 may be formed of any material capable of generating mirror-reflection, for example, a material whose surface is coated with a metal material, in addition to the above-described metal thin film.

A PDLC layer 430 may be formed between the specular reflection plates 440 and the second electrodes 422. The PDLC layer 430 may include polymer 433, liquid crystal 431, and a brightener material 434. The polymer 433 may be formed in the PDLC 430 in a network format. The brightener material 434 signifies a material that emits a visible light by being exited by an ultraviolet light. In addition to a typical fluorescent substance, a variety of materials that are capable of emitting a visible light due to an ultraviolet light may be used as the brightener material 434. The PDLC layer 430 may be formed in a curing process due to photopolymerization reaction in a state in which the liquid crystal 431 and monomers may be uniformly mixed and a small amount of the brightener material 434 may be added. As such, when the brightener material 434 may be included in the PDLC layer 430, scattering of a visible light increases in a state in which a voltage is not applied to the PDLC layer 430 as described later so that reflectance may be improved. In example embodiments, the concentration of the brightener material 434 included in the PDLC layer 430 may be, for example, about 0.01-5 weight %. However, example embodiments are not limited thereto.

In the above structure, as illustrated in FIG. 7, when a voltage is not applied between the first and second electrodes 412 and 422, liquid crystal molecules 432 may be randomly arranged in the PDLC layer 430. In this state in which the liquid crystal molecules 432 are randomly arranged, a white light W output from the external light source 60 and incident on the PDLC layer 430 may be scattered in a variety of directions due to a difference in the refractive indexes of the polymer 433 and the liquid crystal 431. A part of the dispersed light may be transmitted out through the second substrate 420, whereas the other part of the dispersed light may be reflected by the specular reflection plates 440 and scattered and transmitted out through the second substrate 420. Furthermore, as an ultraviolet light UV output from the light source 60 excites the brightener material 434 included in the PDLC 430, a visible light may be emitted from the brightener material 434. The visible light may be scattered and transmitted out through the second substrate 420. As described above, in example embodiments, because not only the white light W of the external light source 60 but also the ultraviolet light UV is used for the scattering of the visible light, reflectance of the light may be improved. Thus, the first and second observers 51 and 52 located above the second substrate 420 recognize a brighter white light. When a voltage is applied between the first and second electrodes 412 and 422, because light is transmitted without being scattered, the possibility of excitation of the brightener material 434 may be reduced so that reflectance of the light is not increased. Accordingly, a reflection inversion phenomenon may be reduced so that visibility may be improved.

In example embodiments, the specular reflection plates 440 may be provided on the upper surfaces of the first electrodes 412. However, when the first electrodes 412 are formed of a transparent conductive material, the specular reflection plates 440 may be provided on lower surfaces of the first electrodes 412. Also, when the first electrodes 412 and the first substrate 410 both are formed of a transparent material, the specular reflection plates 440 may be provided on a lower surface of the first substrate 410.

Figure 8:
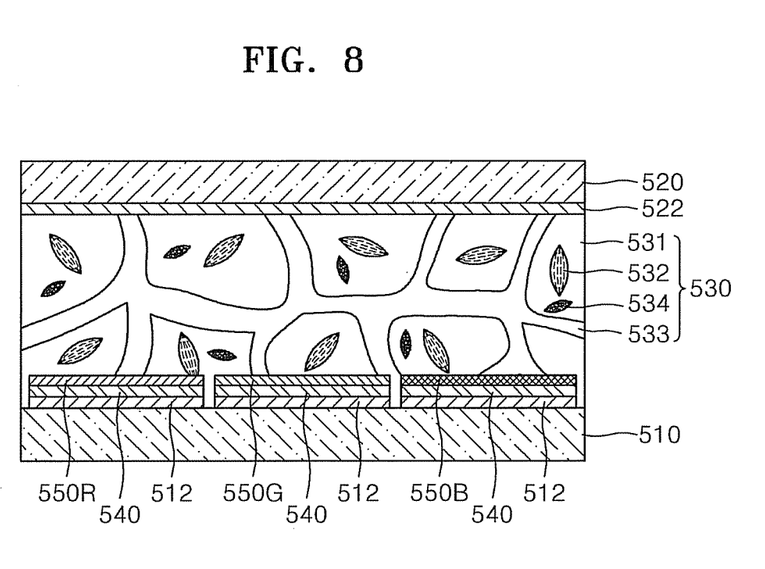
FIG. 8 illustrates a reflective polymer dispersed liquid crystal display device according to example embodiments.

FIG. 8 illustrates a reflective polymer dispersed liquid crystal display device according to example embodiments. In FIG. 8, the reflective polymer dispersed liquid crystal display device of example embodiments adopts a color filter. The following description will focus on technical differences from example embodiments as illustrated in FIG. 7.

The reflective polymer dispersed liquid crystal display device according to example embodiments may include a plurality of pixels as shown in FIGS. 7 and 8, and each of the pixels may include sub-pixels of different colors. For example, each pixel may include red, green, and blue sub-pixels. However, example embodiments are not limited thereto and each pixel may include, for example, cyan, magenta, and yellow sub-pixels.

Referring to FIG. 8, a first substrate 510 that is a lower substrate and a second substrate 520 that is an upper substrate may be arranged to be separated a given distance from each other. A plurality of first electrodes 512 may be formed on an upper surface of the first substrate 510. A plurality of second electrodes 522 may be formed on a lower surface of the second substrate 520. The first electrodes 512 may be formed of, for example, a metal material or a transparent conductive material, e.g., ITO. The second electrodes 522 may be formed of a transparent conductive material. When the reflective display device according to example embodiments is an AM driving display device, the first electrodes 512 have a shape corresponding to sub-pixels and the second electrodes 522 may be integrally formed so as to constitute a common electrode. A TFT (not shown) for a switching drive of a sub-pixel may be connected to each of the first electrodes 512. When the reflective display device according to example embodiments is a PM driving display device, the first electrodes 512 may be arranged in strips parallel to each other and the second electrodes 522 may be formed in strips parallel to each other crossing the first electrodes 512.

A plurality of specular reflection plates 540 may be provided on upper surfaces of the first electrodes 512. The specular reflection plates 540 mirror-reflect incident light and may be formed of, for example, a metal thin film. In addition to the above-described metal thin film, any material capable of generating mirror-reflection, e.g., a material whose surface is coated with a metal material, may be used for the specular reflection plates 540. When the specular reflection plates 540 and the first electrodes 512 both are formed of metal, the specular reflection plates 540 and the first electrodes 512 may be integrally formed. A plurality of color filter layers having different colors may be provided on upper surfaces of the specular reflection plates 540. The color filter layers may be provided corresponding to sub-pixels and may include, for example, a red color filter layer 550R, a green color filter layer 550G, and a blue color filter layer 550B. However, example embodiments are not limited thereto and the color filter layers may include, for example, a cyan color filter layer, a magenta color filter layer, and a yellow color filter layer.

A PDLC layer 530 may be formed between the color filter layers 550R, 550G, and 550B and the second electrodes 522. The PDLC layer 530 may include polymer 533, liquid crystal 531, and a brightener material 534. In FIG. 8, reference numeral 532 denotes liquid crystal molecules. The polymer 533 may be formed in the PDLC 530 in a network format. As described above, the brightener material 534 signifies a material that emits a visible light by being exited by an ultraviolet light. In addition to a typical fluorescent substance, a variety of materials that are capable of emitting a visible light due to an ultraviolet light may be used as the brightener material 534. In example embodiments, the concentration of the brightener material 534 included in the PDLC layer 530 may be, for example, about 0.01-5 weight %. However, example embodiments are not limited thereto.

In the above structure, as described above, because the PDLC layer 530 may include the brightener material 534, when a voltage is not applied to the PDLC layer 530, reflectance of the light incident from the external environment may be increased so that visibility may be improved. In example embodiments, the specular reflection plates 540 are described as being provided on the upper surfaces of the first electrodes 512. However, when the first electrodes 512 are formed of a transparent conductive material, the specular reflection plates 540 may be provided on lower surfaces of the first electrodes 512. Although not shown, when the first electrodes 512 and the first substrate 510 both are formed of a transparent material, the specular reflection plates 540 may be provided on the lower surface of the first substrate 510.

Figure 9:
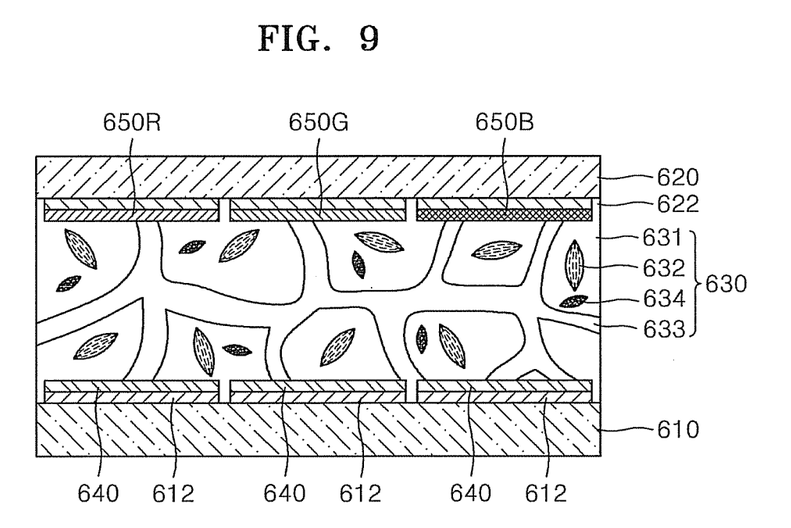
FIG. 9 illustrates a reflective polymer dispersed liquid crystal display device according to example embodiments.

FIG. 9 illustrates a reflective polymer dispersed liquid crystal display device according to example embodiments. FIG. 9 illustrates a modified example of the reflective polymer dispersed liquid crystal display device of FIG. 8. The following description will focus on technical differences from example embodiments as illustrated in FIG. 8.

Referring to FIG. 9, a first substrate 610 and a second substrate 620 may be arranged to be separated a given distance from each other. A plurality of first electrodes 612 may be formed on an upper surface of the first substrate 610. A plurality of second electrodes 622 may be formed on a lower surface of the second substrate 620. A plurality of specular reflection plates 640 may be provided on upper surfaces of the first electrodes 612. The specular reflection plates 640 mirror-reflect incident light and may be formed of, for example, a metal thin film. In addition to the above-described metal thin film, any material capable of generating mirror-reflection, e.g., a material whose surface is coated with a metal material, may be used for the specular reflection plates 640. When the specular reflection plates 640 and the first electrodes 612 both are formed of metal, the specular reflection plates 640 and the first electrodes 612 may be integrally formed.

A plurality of color filter layers having different colors may be provided on lower surfaces of the second electrodes 622. The color filter layers may be provided corresponding to sub-pixels and may include, for example, a red color filter layer 650R, a green color filter layer 650G, and a blue color filter layer 650B. However, example embodiments are not limited thereto and the color filter layers may include, for example, a cyan color filter layer, a magenta color filter layer, and a yellow color filter layer. A PDLC layer 630 may be formed between the color filter layers 650R, 650G, and 650B and the first electrodes 612. The PDLC layer 630 may include polymer 633, liquid crystal 631, and a brightener material 634. In FIG. 9, reference numeral 632 denotes liquid crystal molecules. The polymer 633 may be formed in the PDLC 630 in a network format. As described above, the brightener material 634 signifies a material that emits a visible light by being exited by an ultraviolet light. In addition to a typical fluorescent substance, a variety of materials that are capable of emitting a visible light due to an ultraviolet light may be used as the brightener material 634. In example embodiments, the concentration of the brightener material 634 included in the PDLC layer 630 may be, for example, about 0.01-5 weight %. However, example embodiments are not limited thereto.

In the above structure, as described above, because the PDLC layer 630 may include the brightener material 634, when a voltage is not applied to the PDLC layer 630, reflectance of the light incident from the external environment may be increased so that visibility may be improved. In example embodiments, the specular reflection plates 640 are described as being provided on the upper surfaces of the first electrodes 612. However, when the first electrodes 612 are formed of a transparent conductive material, the specular reflection plates 640 may be provided on lower surfaces of the first electrodes 612. When the first electrodes 612 and the first substrate 610 both are formed of a transparent material, the specular reflection plates 640 may be provided on the lower surface of the first substrate 610.

As described above, according to example embodiments, because the chain transfer reagent or the brightener material may be added to the PDLC layer, reflectance by the specular reflection plate may be reduced when a voltage is not applied, or dispersion of a visible light due to the ultraviolet light excitation may be increased when a voltage is applied. Accordingly, a reflection inversion phenomenon may be reduced so that visibility of the PDLC display device may be improved.

It should be understood that example embodiments described therein should be considered in a descriptive sense only and not for purposes of limitation. Descriptions of features or aspects within each example embodiment should typically be considered as available for other similar features or aspects in other example embodiments.

What is claimed is:

1. A reflective polymer dispersed liquid crystal (PDLC) display device comprises:
    a plurality of first and second electrodes on first and second substrates, the first and second substrates separate from each other;
    a polymer dispersed liquid crystal (PDLC) layer between the plurality of first and second electrodes, the PDLC layer including polymer, liquid crystal, and a chain transfer reagent; and
    a specular reflection plate on the first substrate.

2. The reflective polymer dispersed liquid crystal display device of claim 1, wherein the specular reflection plate is integrally formed with the plurality of first electrodes.

3. The reflective polymer dispersed liquid crystal display device of claim 1, wherein the specular reflection plate is formed of a metal thin film.

4. The reflective polymer dispersed liquid crystal display device of claim 1, wherein the concentration of the chain transfer reagent is about 0.01-1 weight %.

5. The reflective polymer dispersed liquid crystal display device of claim 1, wherein the second substrate and the plurality of second electrodes are formed of a transparent material.

6. The reflective polymer dispersed liquid crystal display device of claim 1, wherein the plurality of first electrodes are formed to correspond to pixels and the plurality of second electrodes are integrally formed to form a common electrode.

7. The reflective polymer dispersed liquid crystal display device of claim 1, wherein the plurality of first and second electrodes are formed in strips crossing each other.

8. The reflective polymer dispersed liquid crystal display device of claim 1, further comprising:
   a plurality of color filter layers on the first substrate, the plurality of color filter layers having different colors.

9. The reflective polymer dispersed liquid crystal display device of claim 8, wherein the plurality of color filter layers include at least one of red, green, and blue color filter layers, and cyan, magenta, and yellow color filter layers.

10. The reflective polymer dispersed liquid crystal display device of claim 1, further comprising:
    a plurality of color filter layers on the second substrate, the plurality of color filter layers having different colors.

11. A reflective polymer dispersed liquid crystal (PDLC) display device comprises:
    a plurality of first and second electrodes on first and second substrates, the first and second substrates separate from each other;
    a polymer dispersed liquid crystal (PDLC) layer between the plurality of first and second electrodes, the PDLC layer including polymer, liquid crystal, and a brightener material that is excited by an ultraviolet light to emit a visible light; and
    a specular reflection plate on the first substrate.

12. The reflective polymer dispersed liquid crystal display device of claim 11, wherein the specular reflection plate is integrally formed with the plurality of first electrodes.

13. The reflective polymer dispersed liquid crystal display device of claim 11, wherein the specular reflection plate is formed of a metal thin film.

14. The reflective polymer dispersed liquid crystal display device of claim 11, wherein the concentration of the brightener material is about 0.01-5 weight %.

15. The reflective polymer dispersed liquid crystal display device of claim 11, wherein the second substrate and the plurality of second electrodes are formed of a transparent material.

16. The reflective polymer dispersed liquid crystal display device of claim 11, wherein the plurality of first electrodes are formed to correspond to pixels and the plurality of second electrodes are integrally formed to form a common electrode.

17. The reflective polymer dispersed liquid crystal display device of claim 11, wherein the plurality of first and second electrodes are formed in strips crossing each other.

18. The reflective polymer dispersed liquid crystal display device of claim 11, further comprising:
    a plurality of color filter layers on the first substrate, the plurality of color filter layers having different colors.

19. The reflective polymer dispersed liquid crystal display device of claim 11, further comprising:
    a plurality of color filter layers on the second substrate, the plurality of color filter layers having different colors.

* * * * *